United States Patent [19]
Loukes

[11] 4,086,073
[45] Apr. 25, 1978

[54] ELECTROLYTIC ION MIGRATION INTO GLASS

[75] Inventor: David Gordon Loukes, Prescot, England

[73] Assignee: Pilkington Brothers Limited, St. Helens, England

[21] Appl. No.: 764,959

[22] Filed: Feb. 2, 1977

[30] Foreign Application Priority Data

Feb. 5, 1976 United Kingdom ............... 4601/76

[51] Int. Cl.² ...................... C03B 18/02; C03C 21/00
[52] U.S. Cl. .................................. 65/30 E; 65/65 A; 65/99 A; 65/182 R
[58] Field of Search ............... 65/65 A, 99 A, 30 E, 65/25 A, 182 R

[56] References Cited

U.S. PATENT DOCUMENTS

| | | | |
|---|---|---|---|
| 3,607,177 | 9/1971 | Robinson et al. | 65/99 A X |
| 3,615,334 | 10/1971 | Lawrenson et al. | 65/99 A X |
| 3,996,034 | 12/1976 | Taylor et al. | 65/99 A X |

Primary Examiner—Arthur D. Kellogg
Attorney, Agent, or Firm—Burns, Doane, Swecker & Mathis

[57] ABSTRACT

A glass surface is modified by maintaining a molten alloy body in contact with the surface, which molten body clings to a locating face which comprises at least two metals which migrate into the glass from the molten alloy body, and which dissolve from the locating face into the molten alloy body as migration proceeds, thereby replenishing the molten alloy body.

20 Claims, 1 Drawing Figure

U.S. Patent    April 25, 1978    4,086,073
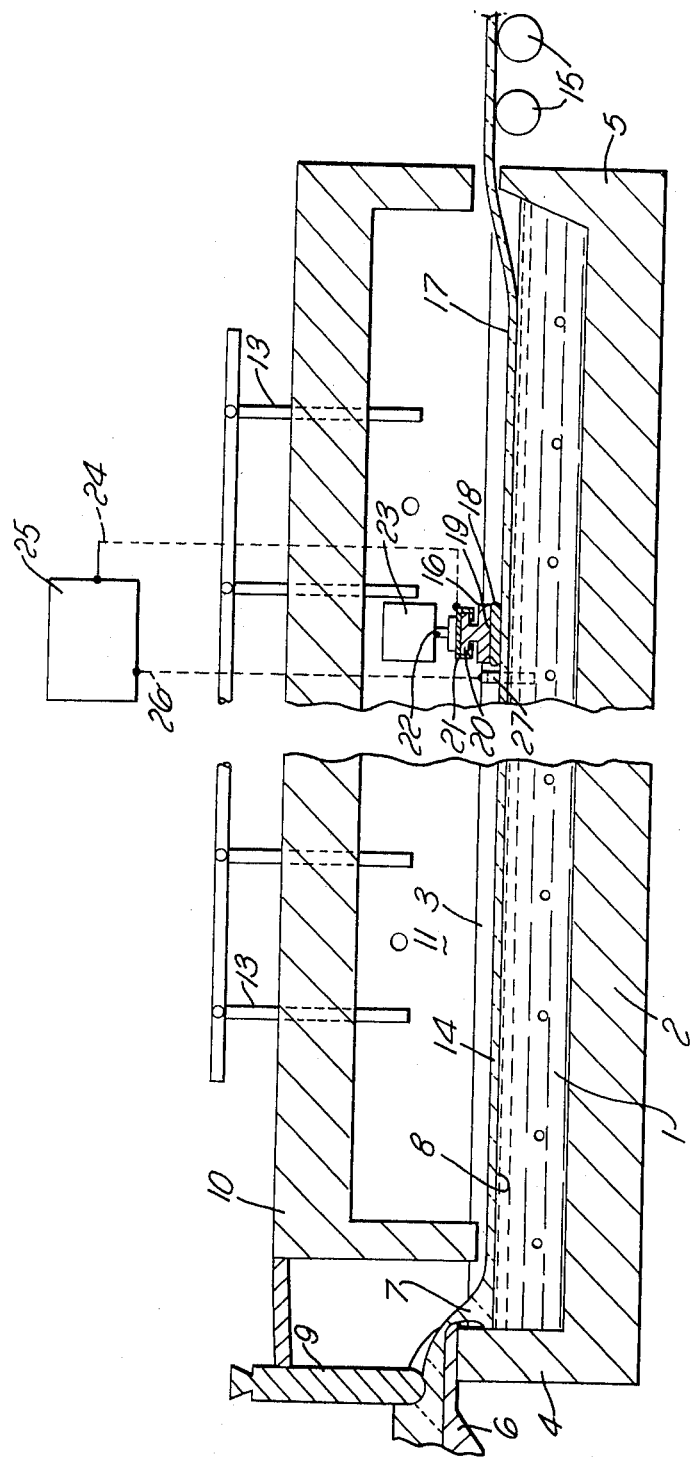

ELECTROLYTIC ION MIGRATION INTO GLASS

BACKGROUND OF THE INVENTION

1. Field of the Invention

This invention relates to a process for modifying the surface of glass. In particular the invention relates to a process in which metal ions are induced to migrate into a hot glass surface from a molten metal body in contact with the glass surface, and to surface-modified glass produced by that process.

2. Description of the Prior Art

In one such process the surfaces of a hot ribbon of glass are contacted with electrically isolated bodies of molten electrically conductive material and a controlled electric current is passed through the glass between the molten bodies. Ions migrate from the anodic molten body into the glass surface and modify the surface characteristics of the glass. Metal ions introduced into the glass surface in this way may remain in ionic form or may be reduced to the metal by exposing the hot glass surface to a reducing atmosphere.

A metal locating member may be used to locate a molten body in position on the glass surface, from which body migration of ions into the glass surface is induced. The locating member may be a metal bar which is mounted above and transversely of a moving ribbon of the glass being treated, the molten body being located on the upper surface of the ribbon by clinging to the underface of the locating member.

Migration of metal ions from a molten metal body into the glass may be induced by regulating the concentration of oxygen in the molten body, for example, by contacting the molten body with a controlled amount of oxidising gas.

A molten alloy body may be used as the source of metal ions which migrate into the glass and the relative proportions of the two metals which migrate may be controlled. This control may be achieved by regulating the temperature of the glass and the voltage applied to bring about migration.

It has now been found that, when two or more metals are simultaneously introduced into the glass from a molten alloy body in contact with the glass, it is particularly advantageous to locate the molten metal body in contact with the glass surface by using a locating member having a locating surface comprising the metals which enter the glass from the molten body.

SUMMARY

The present invention provides a process for modifying the surface of glass whilst the glass is at a temperature at which it is susceptible to surface modification. A molten alloy body is maintained in contact with the glass surface by means of a locating member having a locating face which comprises at least two metals which are to migrate into the glass from the molten body, to which face the molten body clings, and migration of ions of said at least two metals is caused from the molten body into the glass, the molten body being replenished by dissolving of said at least two metals into the molten body from said locating face.

The thicker the layer of desired composition constituting the locating face of the locating member, the more metal will be available for replenishing the molten body.

Preferably the locating face comprises an alloy of said metals. The locating face may contain said two metals in the ratio in which those metals are to be transferred into the glass from the molten alloy body. Solution of the locating face of the locating member then replenishes the molten alloy body.

The molten alloy body may comprise three metals one of which is a solvent for two solute metals, the solvent metal being preferably a metal which is not transferred into the glass to any significant extent during the treatment process, and the solute metals being introduced into the glass surface. The locating face of the locating member then comprises the two solute metals which dissolve from the locating face.

The use of the solvent metal has the major advantage of providing improved control of the proportions of the two solute metals which migrate into the glass. The solvent metal may be bismuth, lead or tin.

As metals from the locating face of the locating member dissolve in the molten alloy body, the composition of the molten alloy body adjusts itself automatically so that the ratio in which the said two metals enter the glass is the same as the ratio in which they are present in the dissolving face of the locating member.

Preferably the composition of the locating face of the locating member is selected to regulate the ratio in which the metals migrate into the glass surface independently of the temperature of the molten alloy body and the voltage applied to effect migration.

The process of the invention is especially suitable for the treatment of a hot ribbon of glass moving relative to the molten metal body, particularly for modifying a surface of a ribbon of glass which is advancing horizontally, a surface of the glass ribbon being contacted with the molten alloy body.

Preferably ionic migration is effected electrolytically from the molten alloy body into the glass surface.

Oxidisable metals may be protected in the glass surface by introducing ions of a "protective" metal into the glass.

One solute metal may be an oxidisable metal and the second solute metal may be a metal which has two stable valency states and is, in the lower valency state, more readily oxidisable than the oxidisable metal, and ions of said oxidisable metal in the glass surface are reduced to the metallic state before exposing the glass surface to oxidising conditions.

In one embodiment the oxidisable solute metal is copper and the second solute metal is tin. The locating face of the locating member may then contain from 98% to 85% by weight of copper and from 2% to 15% by weight of tin.

In another embodiment the oxidisable solute metal is silver and the second solute metal is tin. The locating face of the locating member may then contain from 98% to 90% by weight of silver and from 2% to 10% by weight of tin.

In yet another embodiment the solvent metal is lead, one of the two said solute metals is copper and the second of the said solute metals is a metal which, under the process conditions used, forms a metal oxide which diffuses into the glass surface. The second of the said solute metals may be zinc or tin.

BRIEF DESCRIPTION OF THE DRAWING

Some embodiments of the invention will now be described, by way of example, with reference to the accompanying drawing. The drawing is a vertical section through part of an apparatus for manufacturing flat glass on a molten metal bath.

DESCRIPTION OF THE PREFERRED EMBODIMENTS

Referring to the drawing, a molten metal bath 1, for example of tin or a tin alloy in which tin predominates, is contained in an elongated tank structure having a floor 2, side walls 3, and end walls 4 and 5 respectively at the inlet and outlet ends of the tank structure. A spout 6 extends over the inlet end wall 4 and pours molten glass 7, for example soda-lime-silica glass, onto the surface 8 of the molten metal bath under the control of a regulating tweel 9. A roof structure 10 is mounted over the tank structure to define a head space 11 over the bath into which protective atmosphere, for example 95% by volume nitrogen and 5% by volume hydrogen, is fed through ducts 13. The protective atmosphere is maintained at a plenum in the head space 11.

A ribbon of glass 14 is formed from the molten glass 7 poured on to the bath by permitting the molten glass to spread laterally on the bath to form a molten glass layer which is then advanced in ribbon form along the bath surface 8 by traction applied to the ultimate ribbon discharged from the outlet end of the tank structure by means of traction rollers 15 into an annealing lehr of known kind, not shown. The ribbon is cooled as it is advanced along the bath until it is sufficiently stiffened to be taken unharmed from the bath, and discharged horizontally on the rollers 15, and is further cooled as it is advanced through the lehr.

A bar-shaped locating member 16 is mounted transversely of and just above the upper surface 17 of the glass ribbon 15.

A molten alloy body comprising at least two metals which are to migrate into the glass surface 17, clings to the lower locating face 19 of the locating member which is in the form of an elongated bar with an elongated key portion 20 along its upper surface. The key portion 20 is located with freedom of sliding movement in an elongated metal holder 21 shaped as a partly-closed channel section. The holder 21 is suspended by electrically insulated struts 22 from a water-cooled beam which is indicated generally at 23 and which is supported at each end outside the side walls of the roof structure.

The metal holder 21 for the locating member is connected by a lead 24 to one terminal of an electric supply source indicated at 25, which source may be a D.C. supply or may be a switched supply. The other terminal of the electric supply source 25 is connected by a lead 26 to an electrode 27 which dips into the molten metal bath adjacent one end of the locating member.

When the supply source is providing a steady direct current the connections are such that the locating member 16 is held anodic relative to the bath. When the supply is switched for the production of patterned glass, a switched anodic wave form is supplied on lead 24 to the locating member 16.

The molten alloy body 18 comprises at least two metals whose ions are to migrate electrolytically into the glass under the influence of the applied voltage, for example copper and tin, or silver and tin.

The locating face 19 of the locating member comprises at least the same two metals which are to migrate into the glass from the molten alloy body. The locating face 19 of the locating member dissolves in the molten alloy body 18 during the treatment process as migration is caused of said at least two metals from the molten alloy body into the glass. The molten alloy body is thus replenished by the solution of the locating face of the locating member which preferably contains the two metals in the ratio in which those metals are to be transferred into the glass from the molten alloy body.

It is preferred that the locating face 19 comprises an alloy of the two metals. The member 16 may be made as a whole of an alloy of the two metals.

Alternatively the locating face 19 may be the lower face of a strip of the alloy which is secured to an electrically conductive backing member.

It is possible to use a locating member having a locating face whose composition differs from the relative proportions of the metals transferred into the glass from the molten alloy body, and to use a supplementary method of replenishing the molten alloy body 18.

If the desired composition of the locating face of the locating member readily forms an alloy, the locating member is of homogeneous composition.

However a locating member 16 having a locating face 19 of heterogeneous composition may be used. For example, the locating face may comprise one or more areas of alloy and one or more areas of metal.

If the desired composition does not conveniently form an alloy, a mixture of the components in the desired proportions may be used. The mixture may be formed into the desired configuration by the techniques of powder metallurgy.

The composition of the locating face of the locating member should be such that it is stable in the solid state under the conditions of use.

The locating member may be positioned in the tank structure containing the bath of molten metal at a location where the temperature is in the range 600° C to 900° C. This puts a constraint on the compositions which may be used.

Moreover, at a given temperature and pressure with a two component system, that is, with both the locating face and the molten alloy body clinging to that face consisting of the same two metals, it is a phase rule requirement that there are only two stable phases, and each phase can have only one stable composition.

There are a certain number of stable solid solutions which are in equilibrium with molten solutions comprised of the same two components at temperatures within the required range. To achieve a desired product with a stable system it is often advantageous to use a molten alloy body comprising three metals one of which is a solvent for the other two metals. The solvent metal is a metal which is not transferred into the glass to any significant extent during the treatment process. If solvent metal is transferred into the glass, it may be replenished by feeding metal on to the glass surface upstream of the treatment station so that a replenishing quantity of the molten solvent metal is carried on the glass surface into the molten alloy body.

The two solute metals whose ions are migrating electrolytically into the glass surface from the molten alloy body 18, are replenished in that body at the rate at which they migrate from that body into the glass, by dissolving the two metals from the locating face 19 of the locating member 16. The composition of the molten alloy body is therefore maintained substantially uniform, and desired and controllable amounts of the migrating metals are maintained in the molten alloy body over long periods.

This is particularly advantageous in a continuous process such as is described for modifying the upper surface of a continuous hot ribbon of glass, since the relative proportions of the metals which migrate into the glass from the molten alloy body are maintained constant for a long time.

The particular combination of metals and the relative amounts of each metal which are introduced into the glass surface from the molten alloy body, depend on the effect to be produced, for example the colour and/or solar control properties to be imparted to the glass.

The use of a solvent metal is significant when, under the operating conditions, the metals to be introduced into the glass form a solid alloy which contains the metals in the ratio in which they are to be introduced into the glass.

The solvent metal is therefore a metal which, at the operating temperature, forms a molten alloy with the metals to be introduced into the glass. The solvent metal selected may be a metal which has very little tendency to migrate into the glass when alloyed with the particular solute metals, so that the solute metals migrate preferentially. This is not essential however and it is in some cases beneficial to use a solvent metal which migrates into the glass.

Bismuth is a particularly convenient solvent metal which has little tendency to migrate into the glass and is generally the first choice for use with the metals it dissolves for example silver, copper, lead, nickel, cobalt, tin, indium, zinc, manganese and silicon.

Other useful solvent metals are lead and tin.

Lead dissolves several metals including copper, nickel, cobalt, tin, indium and zinc.

Tin dissolves many metals including iron, zinc, manganese, silicon and titanium.

As metals dissolve from the locating face 19 of the locating member 16 into the molten alloy body 18, the composition of the molten alloy body adjusts itself automatically so that the two metals migrate into the glass surface in the same ratio as the ratio of these metals to one another in the dissolving locating face of the locating member. The composition of the locating face may therefore be selected to regulate the ratio in which the metals migrate into the glass surface independently of the temperature of the molten alloy body and the voltage applied to effect the ionic migration from the molten alloy body into the glass.

When copper or silver ions have been introduced into the surface of flat glass advancing along a molten metal bath using known processes, the metal ions which migrate into the glass may be reduced by the protective nitrogen/hydrogen atmosphere present over the bath, to form a reflecting layer of copper or silver metal in the glass surface. On subsequently passing the glass ribbon through the annealing lehr, it is found that the reflecting layer of metal may be at least partially oxidised to give a surface having a much lower reflectivity that the reflectivity of the surface in the absence of oxidation. Subsequent thermal toughening in the presence of air gives rise to further oxidation and reduced reflectivity.

Oxidisable metals, such as copper and silver, may be protected from oxidation in the glass by introducing ions of a 'protective' metal into the glass with the copper or silver ions. Suitable protective metals are metals which have two stable valency states and, when present in the glass in their lower valency state, are more readily oxidisable than the dispersion in the glass surface of the metal to be protected. Tin serves as a satisfactory 'protective' metal for copper or silver. Other metals, which may be used as protective metals, are iron, indium and manganese.

A molten alloy body consisting of a "protective" metal and a metal to be protected introduces simultaneously into the glass surface the ions of the protective metal and the ions of the metal to be protected, but it has been found difficult to control the ratio of metal to be protected to "protective" metal in the molten body whilst maintaining constant and uniform the composition of the molten body and hence the treatment of the glass. These difficulties are alleviated by applying the techniques of the present invention, that is, by using a molten alloy body comprising the metal to be protected, for example copper or silver, and a "protective" metal, for example tin, dissolved in a solute metal, for example bismuth, and employing a locating member 16 having a locating face 19 comprising both the metal to be protected and the "protective" metal, preferably in the ratio in which they are to be introduced into the glass surface.

Some examples of operation of the invention are as follows:

EXAMPLE 1

On an experimental scale the apparatus described with reference to the drawing was used to produce glass having a continuous reflecting copper layer in the surface using a copper/tin locating member 16 of substantially uniform composition.

Composition of locating member = 8% tin, 92% copper, by weight

Composition of molten alloy body = bismuth in equilibrium with an alloy of 8% tin, 92% copper, by weight.

Bismuth constitutes about 85% of the molten alloy body.

Temperature of molten alloy body = 780° C

Composition of atmosphere = 5% hydrogen, 95% nitrogen by volume

Dimensions of locating member = 50 mm transverse to ribbon movement; 12.5 mm in direction of ribbon movement Ribbon speed = 46 meters/hour Voltage applied = 2.5V continuous Electric current = 0.225 amps continuous Electrolytic treatment = 360 coulombs/square (Electric flux density) meter of glass The treated glass ribbon was passed through the lehr and cut into sheets in known manner. The resultant sheets had continuous reflecting copper layers in the surface. The sheets had a white light transmission of 27% and a white light reflection of 26%. Numerical values of optical properties given in the specification were measured using an illuminant C light source on the treated side of the glass.

One of the sheets was subsequently toughening in air by a thermal toughening process, and there was no significant loss of reflectivity on toughening.

The composition of the metal layer in the glass was analysed and found to correspond to the composition of the alloy locating member 16, that is 8% tin, 92% copper. No significant amount of bismuth was found in the glass. It was found that alloy from the locating face 19 of the locating member 16 had dissolved in the molten alloy body 18, thus replenishing the alloy body.

EXAMPLE 2

The process of Example 1 was repeated with the following conditions:

Temperature of molten alloy body = 770° C

Composition of atmosphere = 10% hydrogen, 90% nitrogen by volume
Voltage applied = 2.0 volts continuous
Electric current = 0.175 amps continuous
Electrolytic treatment = 270 coulombs/square meter (Electric flux density) of glass Similar results to those of Example 1 were obtained. The glass produced had a white light transmission of 42% and a white light reflection of 23%. Metal of the locating face 19 of the locating member had dissolved in the molten alloy body, and the composition of the metal layer in the glass corresponded to the composition of the alloy locating member.

In both Examples 1 and 2 the ratio of tin to copper entering the glass surface is the same as the ratio of tin to copper in the replenishing metal which dissolves from the locating face of the locating member. Thus the ratio of tin to copper entering the glass was regulated by providing a locating member having a locating face of selected composition.

The use of even a very small proportion of tin, for example 0.5% by weight, in the locating face of the locating member provides the copper metal in the glass with some protection from oxidation. However, depending on the conditions to which the treated surface is to be subjected, it is generally preferred to use at least 2% by weight of tin to provide satisfactory protection from oxidation.

It is believed that the use of a high proportion of tin, above 30% by weight, would tend to interfere with the development of the copper colour in the glass. However, in practice, when treating flat glass as it is produced on a molten metal bath, the upper limit of tin concentration in a copper/tin alloy constituting the locating face of the locating member is determined by the melting point of that alloy. If the alloy contains too much tin, say more than 20%, there will be a tendency for a low melting point phase to ooze. For use at high temperatures, for example 800° C, it is desirable that the tin content of the alloy should not exceed 15% by weight in order to avoid melting of the locating face of the locating member.

Thus when using a locating member having a copper/tin location face, it is preferred that the locating face contains 2% to 15% by weight of tin, and 98% to 85% by weight of copper.

The locating face may be composed entirely of a copper/tin alloy having the desired composition. It has been found that when treating the upper surface of a ribbon of flat glass advancing along a molten metal bath there are advantages in using a locating member having a locating face comprising a central area of copper/tin alloy with copper facings. The composition of the alloy and the proportion of alloy to copper being chosen so that the overall composition of the locating face is within the range 2% to 15% by weight of tin and 98% to 85% by weight of copper. The copper facings are provided on the vertical upstream and downstream faces of the locating member 16. These copper facings assist the wetting of the molten alloy body on to the locating face and help to counter any tendency for the upstream and downstream edges of the locating face to dissolve more rapidly than the central area of the locating face.

It is desirable that the locating face of the locating member shall not contain any impurities which detrimentally affect the treatment of the glass. In particular, it has been found desirable to keep the concentration of phosphorous, which tends to interfere with the treatment of the glass, below 200 parts per million and preferably below 100 parts per million. It has also been found to be desirable to avoid as far as possible the presence of reactive metals which form stable oxides in which the valency of the metal is 3 or more, for example, chromium, aluminium, the rare earths, zirconium, silicon and lanthanum.

By providing a switched electric supply to the locating member the process of the invention may be used in applying a decorative treatment to the glass. Suitable techniques for switching the supply and thereby applying decorative treatments are described in U.S. Pat. No. 3,850,605.

EXAMPLE 3

The apparatus described with reference to the drawing was used to produce a decorative pattern in the surface of flat glass advancing in ribbon form along a molten metal bath using a copper/tin alloy locating member which was octagonal in plan. The locating member was made from an alloy containing 8% tin and 92% copper by weight. A series of anodic pulses was applied to the locating member under the following conditions:

Composition of molten alloy body = bismuth in equilibrium with an alloy of 8% tin 92% copper by weight. Bismuth constitutes about 85% of the molten alloy body
Temperature of molten alloy body = 720° C
Composition of atmosphere = 10% hydrogen, 90% nitrogen by volume
Dimensions of locating member = Octagon of area 1400 square millimeters
Ribbon speed = 76 meters/hour
Anodic pulse length = 20 ms
Anodic pulse voltage (peak) = 180 volts
Anodic coulombs per pulse = 0.55 coulombs
Interval between pulses = 2500 ms
Electrolytis treatment = 375 coulombs/square (Electric flux density) meter of glass/pulse The glass ribbon was passed through the lehr and cut into sheets in known manner. Each sheet produced had a decorative pattern comprising a row of reflecting copper octagons in the surface. The copper octagons had a white light transmission of 30% and a white light reflection of 30%. There was no significant loss of reflectivity on subsequent thermal toughening of the glass in air.

This process was repeated with smaller intervals between pulses so as to produce overlap between the treated octagons in the glass surface. The overlapping octagonal pattern elements produced showed good reflectivity which was not lost on subsequent thermal toughening in air.

EXAMPLE 4

The apparatus described with reference to the drawing was used to produce glass having a continuous reflecting silver layer in the surface using a silver/tin locating member 16 of substantially uniform composition.

Composition of locating member = 5% tin, 95% silver, by weight
Composition of molten alloy body = bismuth in equilibrium with an alloy of 5% tin 95% silver, by weight
Temperature of molten alloy body = 707° C Composition of atmosphere = 10% hydrogen, 90% nitrogen by volume Dimensions of locating member = 50 mm transverse to ribbon movement 10 mm in direction of ribbon movement Ribbon speed = 46 meters/hour Voltage applied = 5.1V continuous Electric current = 0.20 amps continuous Electrolytic treatment = 320 coulombs/square (Electric flux density) meter of glass The treated glass ribbon was passed through the lehr and cut into sheets in known manner. The resultant sheets had continuous reflecting silver layers in the surface, with a white light transmission of 30% and a white light reflection of 33%.

One of the sheets was subsequently toughened in air by a thermal toughening process. There was no significant loss of reflectivity on toughening.

The composition of the metal layers in the glass was analysed and found to correspond substantially to the compostion of the alloy locating member, that is, 5% tin 95% silver. No significant amount of bismuth was found in the glass. It was found that alloy from the locating face 19 of the locating member 16 had dissolved in the molten alloy body 18, thus replenishing the alloy body.

The use of even a very small proportion of tin, for example 0.5% by weight, in the locating face 19 of the locating member 16 provides the oxidisable silver metal in the glass with some protection from oxidation. Depending on the conditions to which the treated surface is to be subjected it is preferred to use at least 2% by weight of tin. The silver/tin alloys have lower melting points than the corresponding copper/tin alloys and the locating face 19 will contain less than 10% by weight of tin although higher proportions for example 20% by weight can be used when the melting point of the alloy is not a problem. Thus a silver/tin locating face of a locating member used in the process of the present invention will preferably comprise from 2% to 10% by weight of tin and from 98% to 90% by weight of silver. The locating face 19 may be composed entirely of silver/tin alloy or may comprise a central area of silver/tin alloy with upstream and downstream vertical facings of unalloyed silver.

In Examples 1 to 4, an alloy locating member having a locating face composed of two metals which migrate from the molten alloy body into the glass is used to regulate the ratio in which the two metals enter the glass, independently of the temperature of the alloy body and the voltage used to cause migration.

Copper/lead molten alloy bodies have been used commercially to introduce a copper/lead dispersion into the surface of float glass, the ratio of copper to lead being regulated by selection of the temperature of the molten alloy body and the voltage used to effect migration. It is desirable to be able to control the ratio of copper to lead migrating, independently of the alloy temperature and the voltage used, but, it has not been found practicable, up to the present, to use a locating member with a copper/lead alloy locating face of selected composition to control the ratio in which the copper and lead migrate into flat glass which is advancing along a bath of molten metal. This is because, at the usual temperatures employed in such a flat glass manufacturing process, the copper/lead alloys required are molten.

Nevertheless, an alloy locating member may be used to control the ratio in which copper and lead migrate into the surface of float glass. A locating member having a solid copper/zinc alloy locating face is used in conjunction with a lead/copper/zinc molten body, the lead serving as a solvent for the copper and zinc. When the molten body is connected as an anode with respect to the glass, lead, copper and zinc ions migrate from the molten alloy body into the glass surface. In addition it is believed that at least sone of the lead and zinc diffuses into the glass as oxides, formed by reaction of the metals in the molten body with oxygen which is released electrolytically.

It is found that the presence of increasing proportions of zinc decreases the amount of lead entering the glass, and hence increases the ratio of copper to lead entering the glass. It is believed that zinc oxide is formed more readily than lead oxide, so that oxygen is used up by the zinc and is not available to form lead oxide for diffusion into the glass.

In Examples 5 and 6 the solvent metal in the molten alloy body is lead, one of the two solute metals is copper and the second of the solute metals is zinc or tin each of which metals, under the process conditions used, forms a metal oxide which dissolves into the glass surface. The solute metals are replenished by solution from the locating face of the locating member.

EXAMPLE 5

The apparatus described with reference to the drawing was used to produce glass having a continuous copper/lead dispersion in the surface, the copper and lead being present in a desired ratio. The locating member used was composed of an alloy of 5% by weight of zinc and 95% by weight of copper.

Composition of molten alloy body = lead is equilibrium with copper and zinc dissolved from the locating member Temperature of molten alloy body = 775° C Composition of atmosphere = 10% hydrogen, 90% nitrogen by volume Dimensions of locating member = 50 mm transverse to ribbon movement; 12.5 mm in direction of ribbon movement Ribbon speed = 46 meters/hour Voltage applied = 2.9V continuous Electric current = 0.225 amps continuous Electrolic treatment = 350 coulombs/square (Electric flux density) meter of glass The treated glass was passed through the lehr and cut into sheets in known manner. The sheets had a continuous metal dispersion in the surface containing copper, lead and zinc in the following amounts:

Copper in glass = 139 mg/square meter of glass

Lead in glass = 119 mg/square meter of glass

Zinc in glass = 7 mg/square meter of glass

The sheets had a white light transmission of 40% with variations up to 65% which were believed to result from oxidation of the metal dispersion in the lehr. The white light reflectivity was also variable and had a maximum of 21%. On subsequent thermal toughening of one of the sheets in air, there was a substantial loss of reflectivity and a gain in transmission as the metal dispersion in the glass surface was oxidised.

EXAMPLE 6

To avoid oxidation in the lehr and on subsequent toughening, the procedure described in Example 5 was repeated using tin in place of zinc. The locating member used was composed of an alloy of 8% by weight tin and 92% by weight copper.

Composition of molten alloy body = lead in equilibrium with copper and tin dissolved from the locating member
Temperature of molten alloy body = 775° C
Composition of atmosphere = 10% hydrogen, 90% nitrogen by volume
Dimensions of locating member = 50 mm transverse to direction of ribbon movement
Ribbon speed = 46 meters/hour
Voltage applied = 2.6V continuous
Electric current = 0.25 amps continuous
Electrolytic treatment = 390 coulombs/square (Electric flux density) meter of glass The treated glass was passed through the lehr and cut into sheets in known manner. The sheets had a continuous metal dispersion in the surface containing copper, tin and lead in the following amounts:

Copper in glass = 181 mg/square meter of glass
Lead in glass = 85 mg/square meter of glass
Tin in glass = 16 mg/square meter of glass The sheets had a white light transmission of 33% and a white light reflectivity of 18%. The optical properties were substantially uniform, suggesting that there had been no significant oxidation of the metal dispersion in the lehr. On subsequent toughening in air, there was no significant loss of reflectivity. It is believed that the presence of tin in the molten alloy body had two effects:

(a) Tin ions reacted with oxygen in the molten alloy body and the resultant tin oxide diffused into the glass. This reduced the amount of oxygen available for the formation of lead oxide in the molten body, and hence reduced the amount of lead diffusing as lead oxide into the glass.

(b) The tin ions protected the lead in the glass surface from oxidation in the lehr and on subsequent thermal toughening of the glass in air.

In Examples 5 and 6, zinc and tin are used to reduce the amount of lead introduced into the glass surface from a molten alloy body containing copper in lead. In this way, the ratio of copper to lead in the glass is increased substantially above values that may conveniently be achieved using a copper/lead alloy body with a copper locating member for the treatment of float glass. Increasing the ratio of copper to lead shifts the colour of the glass towards the red colour of a pure copper dispersion.

The solvent metal, lead, migrates into the glass. The lead content of the molten alloy body may be replenished by feeding lead on to the edges of the ribbon advancing along the bath. The molten lead is carried on the ribbon into the molten alloy body and is incorporated in that body.

Other metals which react with oxygen more readily than lead may be used to increase the ratio of copper to lead introduced into the surface of glass from a molten alloy body containing copper and lead. Metals like tin and zinc which readily form oxides which diffuse into the glass surface may be used in preventing or reducing the diffusion into the glass surface of other metals such as bismuth and indium in the form of their oxides.

The migration of ions from the molten alloy body into the glass surface may be enforced by regulation of the concentration of oxygen in the molten alloy body.

I claim:

1. A process for modifying the surface of glass while the glass is at a temperature at which it is susceptible to surface modification by electrolytic migration of ions, comprising:

(a) maintaining a molten alloy body, comprising at least two metals which are to migrate into the glass in a predetermined ratio, in contact with the glass surface, at a location where the temperature is least 600° C, by means of a locating member having a locating face to which the molten body clings, which face comprises at least said two metals in the same ratio in which said metals are to migrate into the glass from the molten body;

(b) electrolytically causing migration of ions of said at least two metals from the molten body into the glass in said predetermined ration by applying an electrical potential across the glass so as to produce an electric flux density of at least 270 coulombs per square meter of the glass surface; and (c) replenishing the molten body by dissolving of said at least two metals into the molten body from said locating face.

2. A process according to claim 1, wherein the locating face comprises an alloy of said metals.

3. A process according to claim 1, wherein the locating face of the locating member, which face dissolves in the molten alloy body during the treatment process, contains said two metals in the ratio in which those metals are to be transferred into the glass from the molten alloy body.

4. A process according to claim 1, wherein the solvent metal is a metal which is not transferred into the glass to any significant extent during the treatment process.

5. A process for modifying the surface of glass while the glass is at a temperature at which it is susceptible to surface modification by electrolytic migration of ions, comprising:

(a) maintaining in contact with the glass surface a molten alloy body at a location where the temperature is at least 600° C, comprising a solvent metal and two solute metals which solute metals are to be introduced into the glass surface in a predetermined ratio, by means of a locating member having a locating face to which said molten alloy clings, which face comprises said two solute metals in the same ratio in which said two solute metals are to migrate into the glass from the molten alloy body;

(b) electrolytically causing migration of ions of said two solute metals from the molten alloy body into the glass in said predetermined ratio by applying an electrical potential across the glass so as to produce an electric flux density of at least 270 coulombs per square meter of the glass surface; and (c) replenishing the molten body by dissolving said two solute metals of the locating face into the molten alloy body in the same ratio as they are depleted from the molten alloy body.

6. A process according to claim 5, wherein the solvent metal is bismuth.

7. A process according to claim 5, wherein the solvent metal is lead.

8. A process according to claim 5, wherein the solvent metal is tin.

9. A process for modifying a surface of glass while the glass is at a temperature at which it is susceptible to surface modification by the electrolytic migration of ions, comprising maintaining in contact with the glass surface at a location where the temperature is at least 600° C, a molten alloy body comprising a solvent metal and two solute metals which are to migrate into the glass in a predetermined ratio, one of the solute metals being an oxidisable metal and the second solute metal being a metal which has two stable valency states and is in the lower valency state more readily oxidisable than the oxidisable solute metal; the contact being maintained by means of a locating member having a locating face to which the molten body clings which face comprises said two solute metals in the predetermined ratio in which said metals are to migrate into the glass from the molten body; electrolytically causing migration of ions of the solute metals from the molten alloy body into the glass surface in said predetermined ratio by applying an electrical potential across the glass so as to produce an electric flux density of at least 270 coulombs per square meter of the glass surface; replenishing the molten body by dissolving of the solute metals from the locating face into the molten alloy body in the same ratio as they are depleted; and reducing ions of said oxidisable solute metal in the glass surface to the metallic state before exposing the glass surface to oxidising conditions.

10. A process according to claim 9, wherein the oxidisable solute metal is copper and the second solute metal is tin.

11. A process according to claim 10, wherein the solvent metal is bismuth.

12. A process according to claim 10, wherein the locating face of the locating member contains from 98% to 85% by weight of copper and from 2% to 15% by weight of tin.

13. A process according to claim 9, wherein the oxidisable solute metal is silver and the second solute metal is tin.

14. A process according to claim 13, wherein the solvent metal is bismuth.

15. A process according to claim 13, wherein the locating face of the locating member contains from 98% to 90% by weight of silver and from 2% to 10% by weight of tin.

16. A process according to claim 5, wherein the solvent metal is lead, one of the two said solute metals is copper and the second of the said solute metals is a metal which, under the process conditions used, forms a metal oxide which diffuses into the glass surface.

17. A process according to claim 16, wherein the second of the said solute metals is zinc.

18. A process according to claim 16, wherein the second of the said solute metals is tin.

19. A process for modifying the surface of glass while the glass is at a temperature at which it is susceptible to surface modification by an electrically induced migration of ions, comprising:
(a) maintaining a molten alloy body, comprising at least two metals which are to migrate into the glass in a predetermined ratio, in contact with the glass surface at a location where the temperature is at least 600° C, by means of a locating member having a locating face to which the molten body clings, which face comprises at least said two metals in the same ratio in which said metals are to migrate into the glass from the molten body;
(b) applying a voltage of at least two volts between said molten body and the glass to cause migration of ions of said at least two metals from the molten body into the glass in said predetermined ratio; and
(c) replenishing the molten body by dissolving of said at least two metals into the molten body from said locating face.

20. A process for modifying the surface of glass while the glass is at a temperature at which it is susceptible to surface modification the migration of ions, comprising:
(a) maintaining a molten alloy body, comprising at least two metals which are to migrate into the glass in a predetermined ratio, in contact with the glass surface at a location where the temperature is at least 600° C by means of a locating member having a locating face to which the molten body clings, which face comprises at least said two metals in the same ratio in which said metals are to migrate into the glass from the molten body;
(b) regulating the concentration of oxygen in the molten body to cause migration of ions of said at least two metals from the molten body into the glass in said predetermined ratio; and
(c) replenishing the molten body by dissolving of said at least two metals into the molten body from said locating face.

* * * * *